US011416723B2

(12) United States Patent
Kondo

(10) Patent No.: US 11,416,723 B2
(45) Date of Patent: Aug. 16, 2022

(54) IMAGE PROCESSING APPARATUS, AND NON-TRANSITORY COMPUTER-READABLE RECORDING MEDIUM THEREFOR

(71) Applicant: Brother Kogyo Kabushiki Kaisha, Nagoya (JP)

(72) Inventor: Tomoya Kondo, Konan (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 228 days.

(21) Appl. No.: 16/801,271

(22) Filed: Feb. 26, 2020

(65) Prior Publication Data

US 2020/0311497 A1 Oct. 1, 2020

(30) Foreign Application Priority Data

Mar. 28, 2019 (JP) ............................ JP2019-062210

(51) Int. Cl.
*G06K 15/02* (2006.01)
*B41J 2/175* (2006.01)
*B41J 2/045* (2006.01)

(52) U.S. Cl.
CPC ...... *G06K 15/1881* (2013.01); *B41J 2/04508* (2013.01); *B41J 2/175* (2013.01)

(58) Field of Classification Search
None
See application file for complete search history.

(56) References Cited

U.S. PATENT DOCUMENTS 6,467,891 B2 * 10/2002 Moriyama ............. B41J 2/2114 347/96
2010/0214336 A1 8/2010 Kuno
2012/0213569 A1 8/2012 Kuno
2013/0194589 A1 8/2013 Suzuki
2016/0191745 A1 * 6/2016 Morikawa .............. H04N 1/407 358/523
2018/0007238 A1 1/2018 Shimahashi et al.
2020/0042841 A1 2/2020 Morikawa et al.
2020/0055324 A1 2/2020 Kuno et al.
(Continued)

FOREIGN PATENT DOCUMENTS

JP 2010-194882 A 9/2010
JP 2012-171143 A 9/2012
(Continued)

*Primary Examiner* — Alejandro Valencia
(74) *Attorney, Agent, or Firm* — Burr & Brown, PLLC

(57) ABSTRACT

An image processing apparatus configured to generate, using a target image data, multiple pieces of partial print data respectively for multiple partial printings such that, in a particular case where the color difference indicated by the evaluation value of the each of the partial images is larger than a particular reference value, a controller causes the image processing apparatus to identify, using the difference information, compensation target pixels including a pixel causing the color difference from among multiple pixels within the particular partial image, perform, using the difference information, a compensating process of converting a color of the compensation target pixel to a color of which color difference is small, and generate the partial print data using the particular partial image data to which the compensating process has been applied.

5 Claims, 9 Drawing Sheets

(56) References Cited

U.S. PATENT DOCUMENTS

| | | | |
|---|---|---|---|
| 2020/0156385 | A1 | 5/2020 | Arakane et al. |
| 2020/0293842 | A1 | 9/2020 | Morikawa et al. |
| 2021/0037165 | A1 | 2/2021 | Morikawa |

FOREIGN PATENT DOCUMENTS

| | | | |
|---|---|---|---|
| JP | 2013-156930 | A | 8/2013 |
| JP | 2018-001532 | A | 1/2018 |
| JP | 2020-023074 | A | 2/2020 |
| JP | 2020-028988 | A | 2/2020 |
| JP | 2020-028989 | A | 2/2020 |
| JP | 2020-082424 | A | 6/2020 |
| JP | 2020-116861 | A | 8/2020 |
| JP | 2020-157586 | A | 10/2020 |
| JP | 2021-020419 | A | 2/2021 |
| JP | 2021-024084 | A | 2/2021 |

* cited by examiner

| REPRESENTATIVE VALUE RV | THE NUMBER OF PIXELS N | CONTRIBUTION DV |
|---|---|---|
| RV1 | N1 | DV1 |
| RV2 | N2 | DV2 |
| RV3 | N3 | DV3 |
| ⋮ | ⋮ | ⋮ |
| ⋮ | ⋮ | ⋮ |
| ⋮ | ⋮ | ⋮ |

IMAGE PROCESSING APPARATUS, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2019-062210 filed on Mar. 28, 2019. The entire subject matter of the application is incorporated herein by reference.

BACKGROUND

Technical Field

The present disclosures relate to an image processing apparatus provided with a print execution device, and is configured to perform printing by repeatedly executing a partial printing to form dots with performing a main scanning and a sub scanning.

Related Art

Conventionally, there has been known a printer which is configured to perform a bi-directional printing. The bi-directional printing is a technique to print an image with performing a main scanning to move a print head in a first direction and another main scanning to move the print head in a second direction, which is opposite to the first direction. In comparison with a one-directional printing, in which the printing is performed only when the print head is moved in one direction and the printing is not performed when the print head is moved in the opposite direction, the bi-direction printing is advantageous since a printing speed can be increased.

When the bi-directional printing is performed, different colors may be exhibited when the main scanning in the first direction and the main scanning in the second direction are performed although the same color should be exhibited. When the directions in which the print head is moved are different, the order of superimposition of different color ink droplets are different. Therefore, for a viewer, the resultant colors could be recognized as different colors. In order to suppress occurrence of such a phenomenon, there is known a technique according to which a characteristic value regarding amount of ink to be used for printing is calculated for each of a plurality of blocks (i.e., areas) within a band-like area, and the printing direction is restricted to one direction (e.g., the first direction) when the calculated characteristic value is greater than a threshold value.

SUMMARY

According to the above-described conventional technique, since the print direction is limited to a particular direction, when the main scanning in the particular direction (i.e., the one-directional printing) is repeatedly performed, the printing speed is decreased in comparison with a case where the bi-directional printing is performed.

According to aspects of the present disclosures, there is provided an image processing apparatus configured to generate print data to be used by a print execution device, the print execution device having a print head, the print head being provided with first kind of nozzles configured to eject first kind of ink and second kind of nozzles configured to eject second kind of ink, the first kind of nozzles and the second kind of nozzles being arranged on different positions in a main scanning direction. The image processing apparatus has a controller configured to generate partial print data. The print execution device is configured to perform a partial printing, in accordance with the partial print data, by driving the print head to repeatedly perform a main scanning to move in the main scanning direction relative to a printing medium, the ink being ejected on to the printing medium while the print head is being moved in the main scanning, and a sub scanning to move the printing medium relative to the print head in a sub scanning direction which is a direction intersecting with the main scanning direction. The controller is configured to cause the image processing apparatus to perform an image obtaining process of obtaining target image data indicating a target image to be printed referring to color values of a particular color space, an evaluation value obtaining process of obtaining, for each of multiple partial images included in the target image, an evaluation value indicative of a color difference between an image which would be printed when the partial printing to print the partial image is performed in a first direction along the main scanning direction and an image which would be printed when the partial printing to print the partial image is performed in a second direction opposite to the first direction based on the target image data, the evaluation value being obtained using difference information associating the color value in the particular color space with degree of the color difference, and a print data generating process of generating, using the target image data, multiple pieces of the partial print data respectively for multiple partial printings. The print execution device is configured to print a printing image based on the target image data by performing the multiple partial printings, the multiple partial printings including the partial printings performed in the first direction and partial printings performed in the second direction. In a particular case where the color difference indicated by the evaluation value of the each of the partial images is larger than a particular reference value, the controller causes the image processing apparatus to identify, using the difference information, compensation target pixels including a pixel causing the color difference from among multiple pixels within the particular partial image, perform, using the difference information, a compensating process of converting a color of the compensation target pixel to a color of which color difference is small, and generate the partial print data using the particular partial image data to which the compensating process has been applied.

According to aspects of the present disclosures, there is provided a non-transitory computer-readable recording medium storing instructions for an image processing apparatus configured to generate print data to be used by a print execution device, the image processing apparatus having a print head, the print head being provided with first kind of nozzles configured to eject first kind of ink and second kind of nozzles configured to eject second kind of ink, the first nozzles and the second nozzles being arranged on different positions in a main scanning direction, and a controller configured to cause the print execution device to perform a partial printing by controlling the print head to repeatedly perform a main scanning to move in the main scanning direction relative to a printing medium, the ink being ejected on to the printing medium while the print head is being moved in the main scanning, and a sub scanning to move the printing medium relative to the print head in a sub scanning direction which is a direction intersecting with the main scanning direction. The instructions cause, when executed by the controller, the image processing apparatus to perform an image obtaining process of obtaining target image data indicating a target image to be printed using color values in a particular color referring to color values of a particular color space, an evaluation value obtaining process of obtaining, for each of multiple partial images included in the target image, an evaluation value indicative of a color difference between an image to be printed when the partial printing to print the partial image is performed in a first direction along the main scanning direction and an image to be printed when the partial printing to print the partial image is performed in a second direction opposite to the first direction based on the target image data, and a print data generating process of generating multiple pieces of partial print data for multiple partial printings using the target image data. The instructions further cause, when executed by the controller, the print execution device to print a printing image based on the target image data by causing the print execution device to perform the multiple partial printings, the multiple partial printings including the partial printings performed in the first direction and partial printings performed in the second direction. In a particular case where the color difference indicated by the evaluation value of the each of the partial images is larger than a particular reference value, the instructions further cause, when executed by the controller, the image processing apparatus to identify, using the difference information, compensation target pixels including a pixel causing the color difference from among multiple pixels within the particular partial image, perform, using the difference information, a compensating process of converting a color of the compensation target pixel to a color of which color difference is small, and generate the partial print data using the particular partial image data to which the compensating process has been applied.

BRIEF DESCRIPTION OF THE ACCOMPANYING DRAWINGS

Figure 3A:
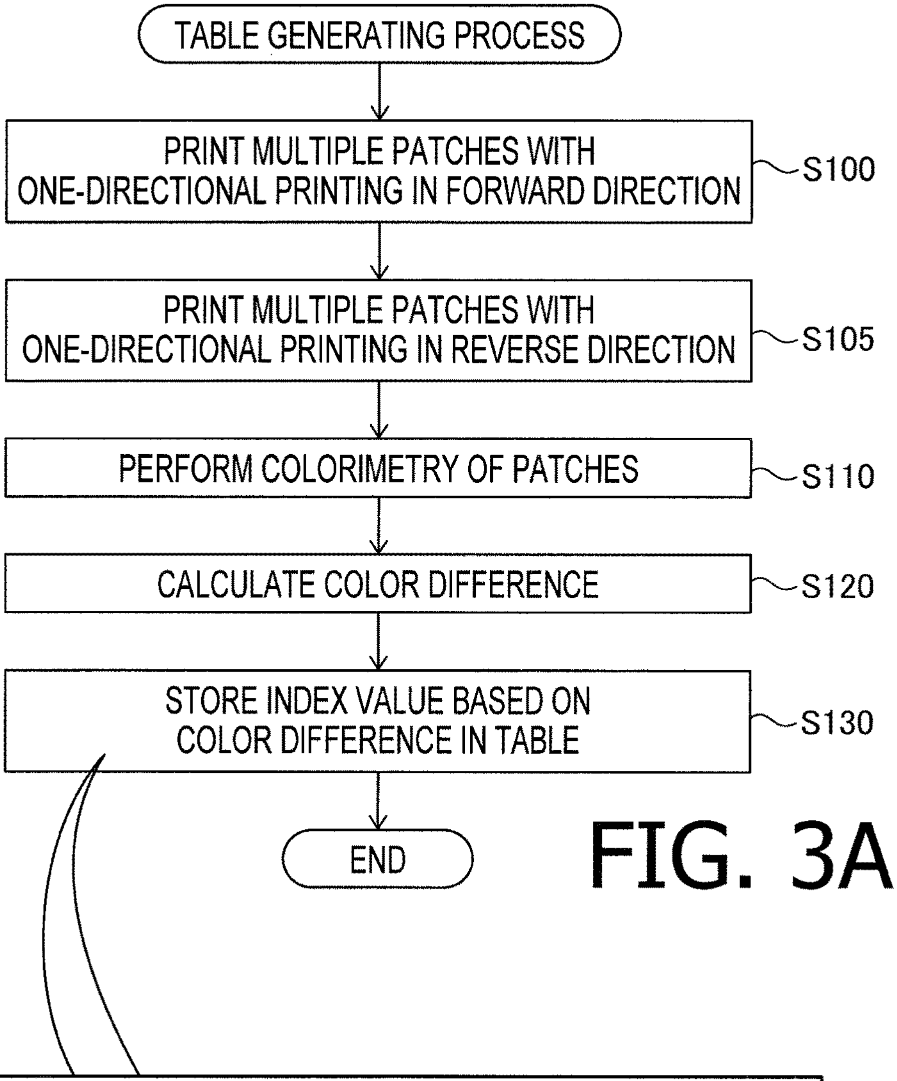
FIG. 3A is a flowchart illustrating a difference table generating process.
Figure 3B:
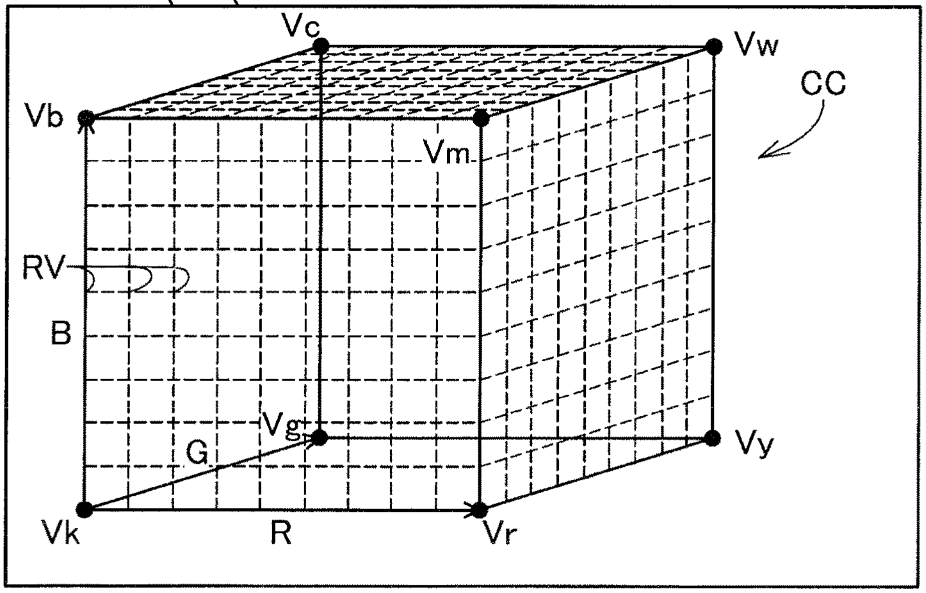

FIG. 3B schematically shows an RGB color space.

Figure 4:
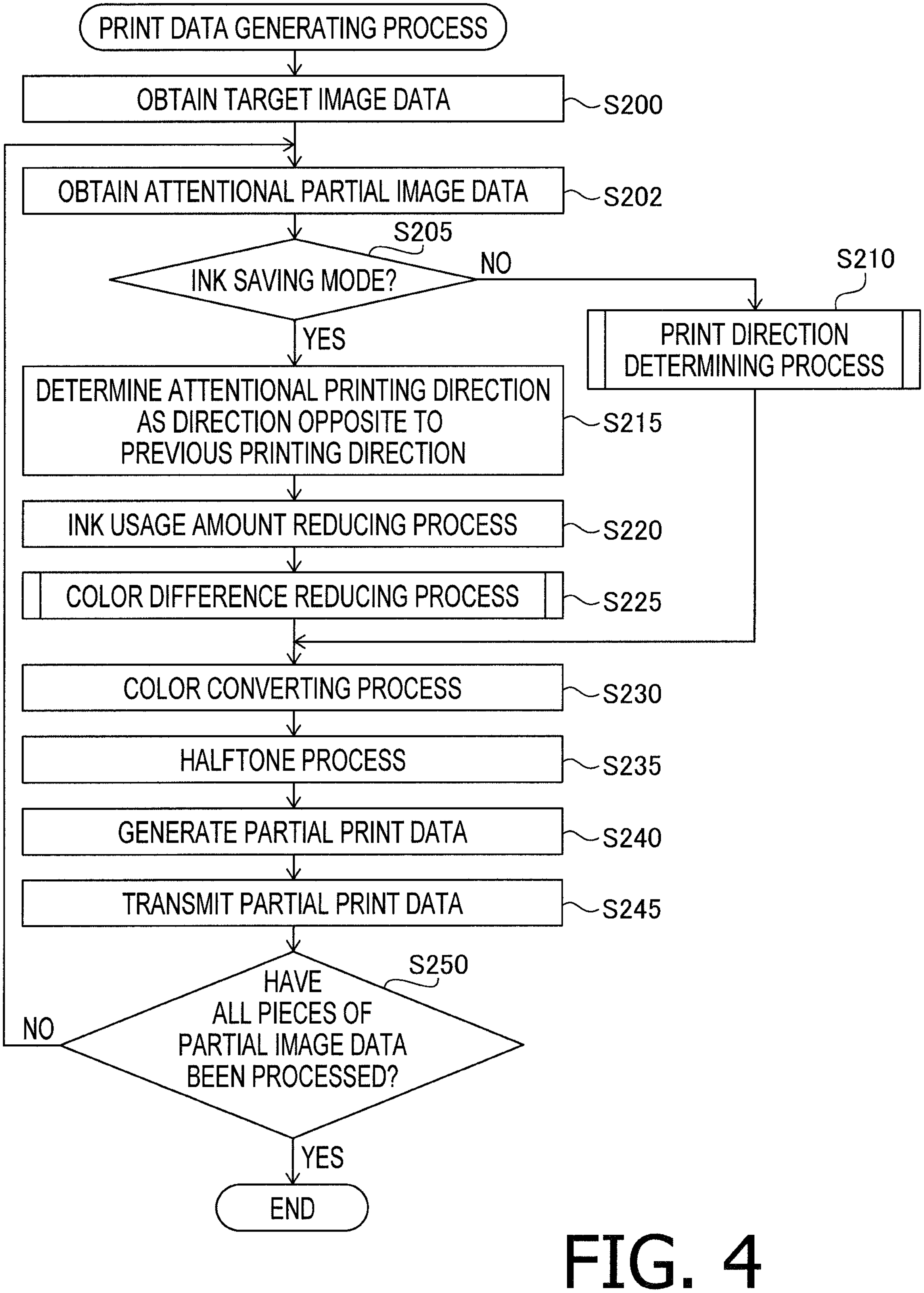

FIG. 4 is a flowchart illustrating a print data generating process.

Figure 5:
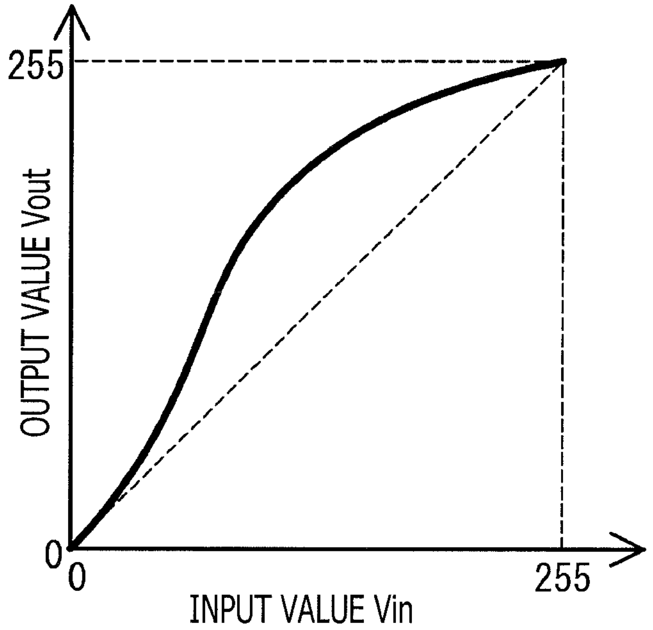

FIG. 5 is a graph showing a tone curve for an ink usage mount decreasing process.

Figure 6:
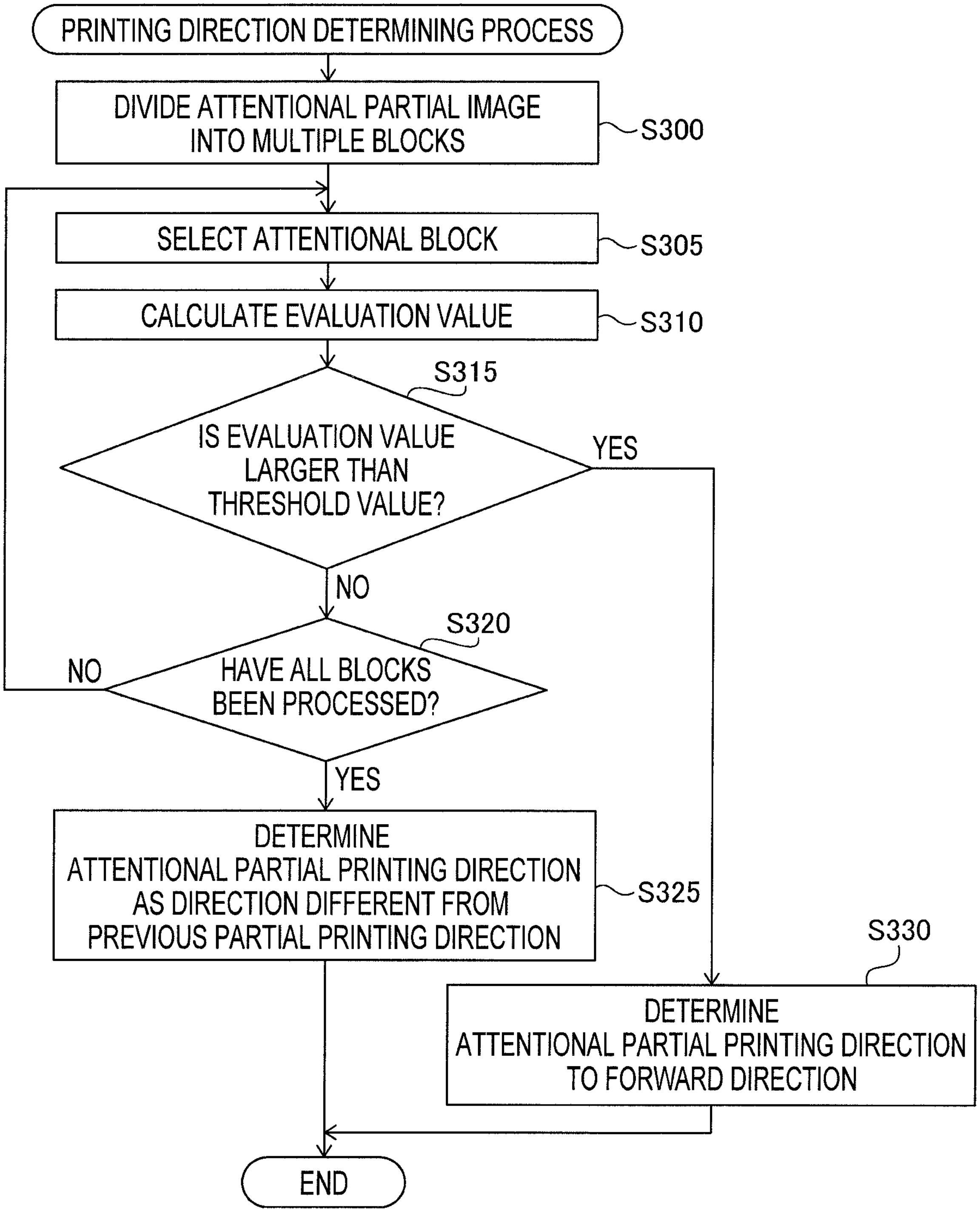

FIG. 6 is a flowchart illustrating a printing direction determining process.

Figure 7:
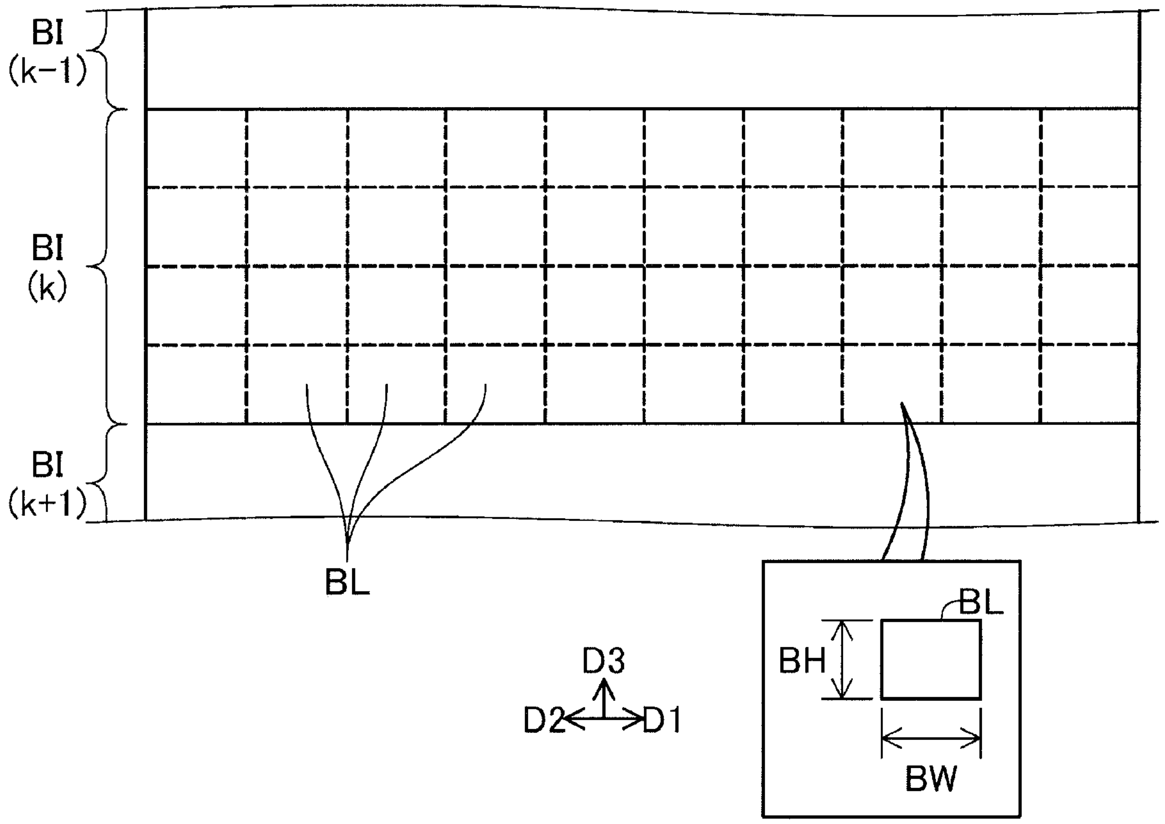

FIG. 7 illustrates a partial image and a plurality of blocks.

Figure 8:
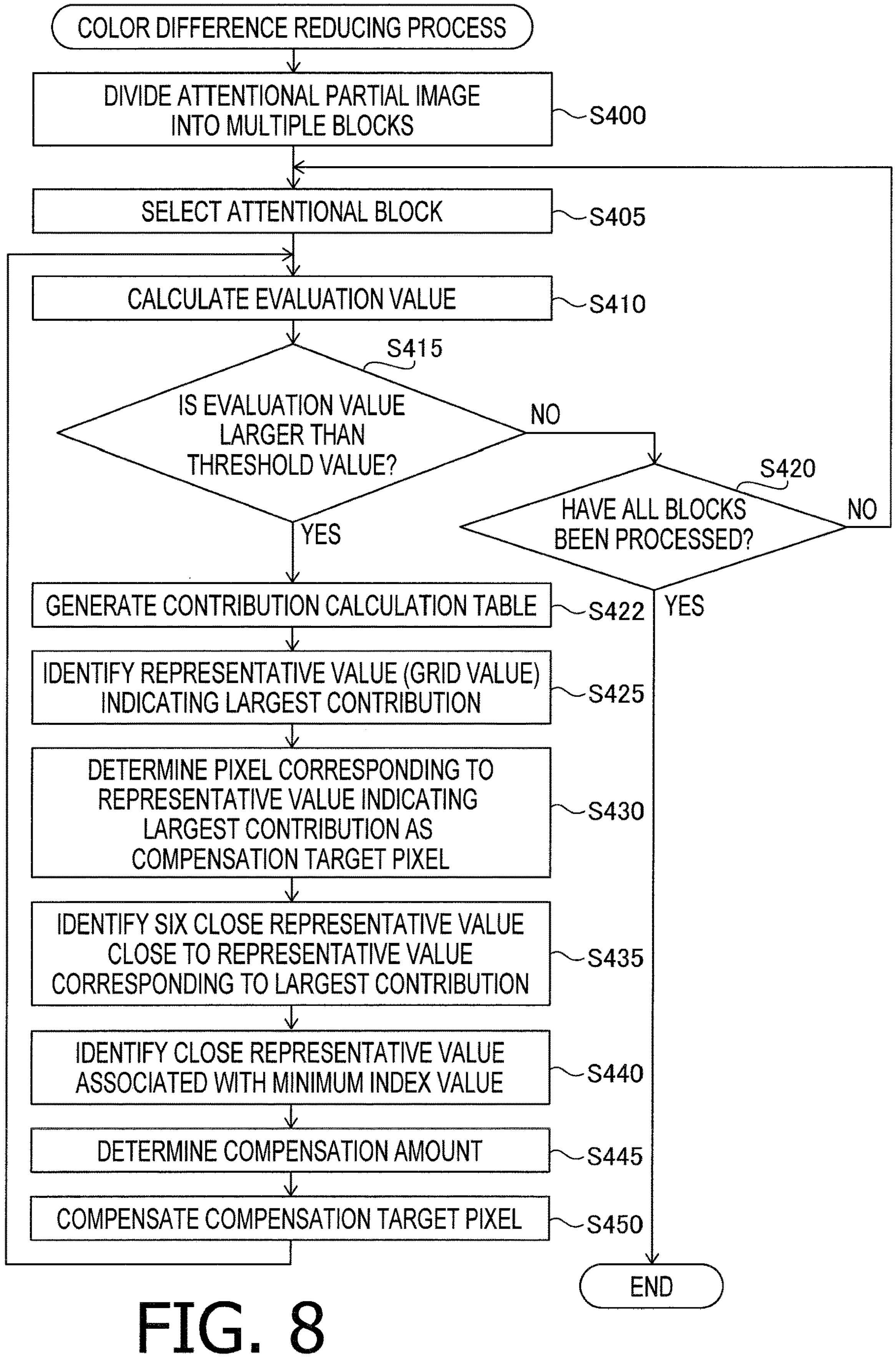

FIG. 8 is a flowchart illustrating a color difference reducing process.

Figures 9, 10:
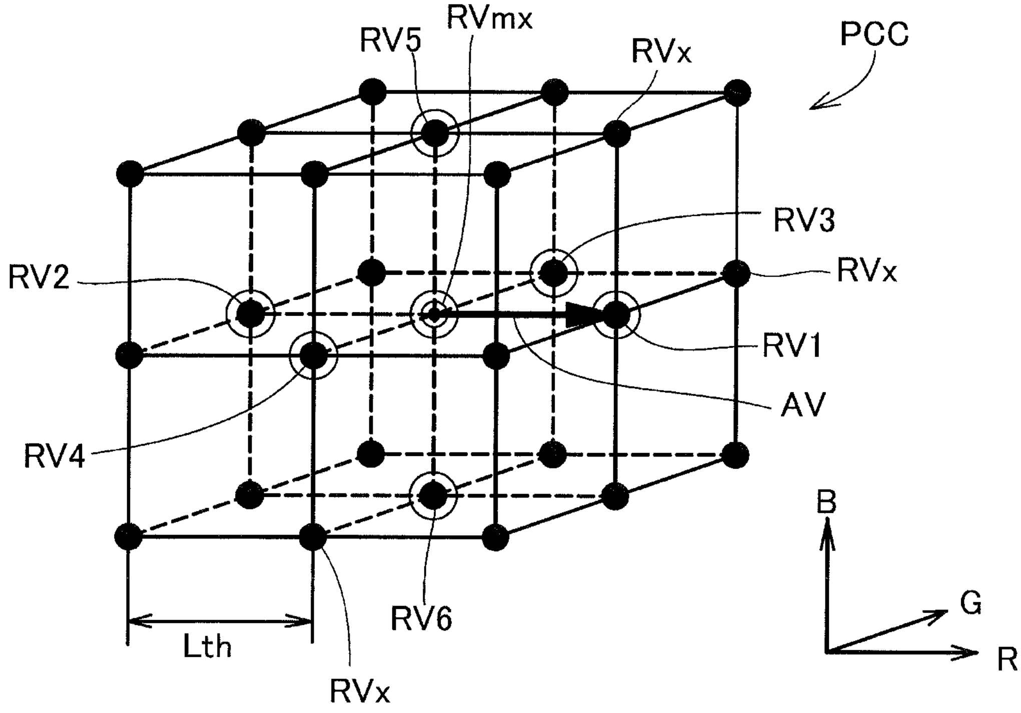

FIG. 9 is an example of a contribution calculation table.

FIG. 10 schematically shows a part of an RGB color space centering around a representative value.

DETAILED DESCRIPTION OF EMBODIMENTS

A. First Embodiment

A-1. System Configuration

Figure 1:
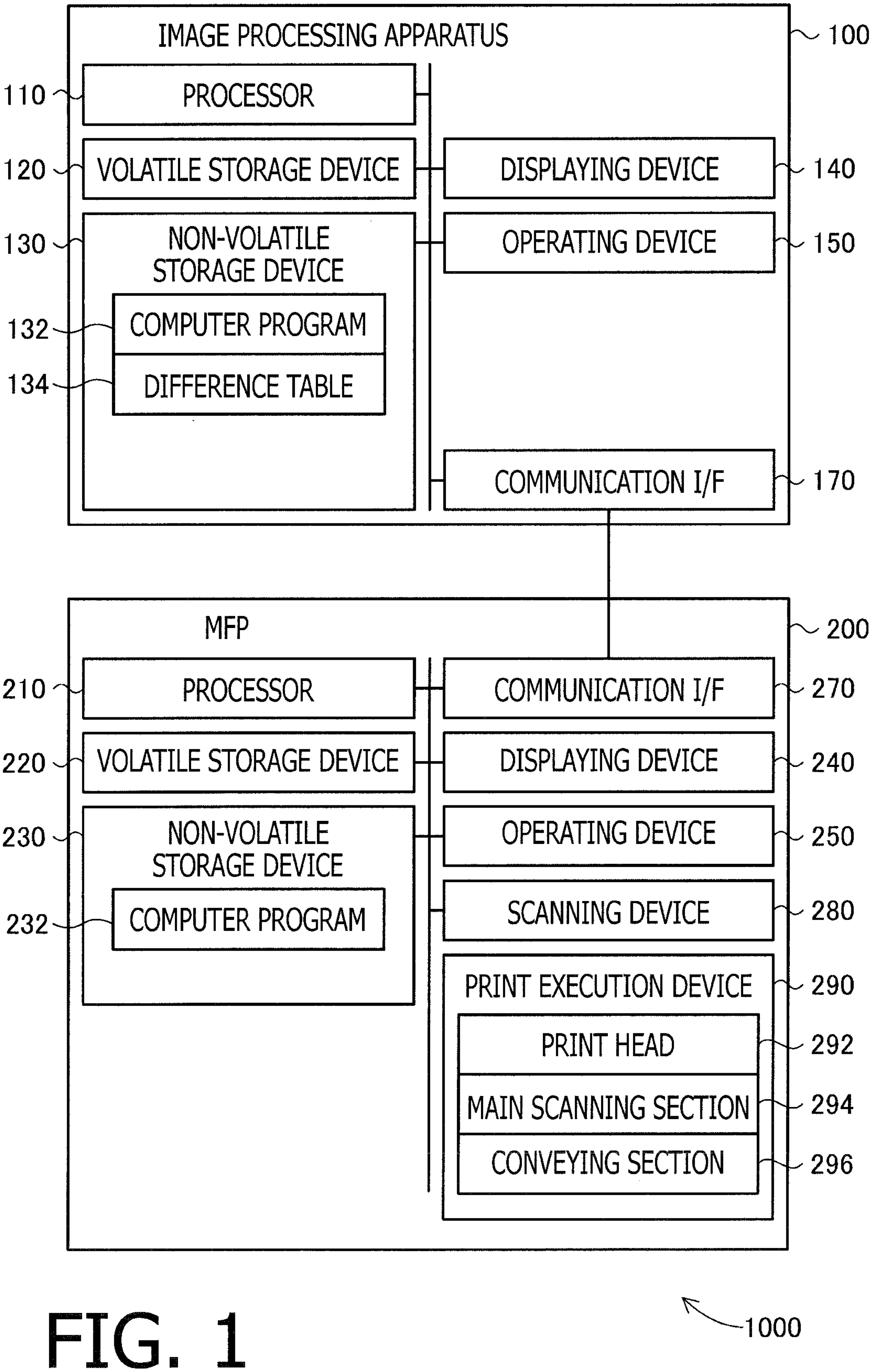
FIG. 1 is a block diagram illustrating an image processing system according to an embodiment of the present disclosures.

FIG. 1 shows an image processing system 1000 according to the present disclosures. The image processing system 1000 includes an image processing apparatus 100 and an MFP 200 communicably connected to the image processing apparatus 100. The MFP 200 has a print execution device 290 configured to print an image.

The image processing apparatus 100 is, for example, a personal computer (e.g., a desk top computer, a tablet computer or the like). The image processing apparatus 100 includes a processor 110, a volatile storage device 120, a non-volatile storage device 130, a displaying device 140, an operating device 150 and a communication I/F 170. The above components inside the image processing apparatus 100 are communicably interconnected through a bass.

The processor 110 is a device configured to perform data processing. For example, the processor 110 is a CPU. An example of the volatile storage device 120 is a DRAM, and examples of the non-volatile storage device 130 are flash memory and a hard disk.

The non-volatile storage device 130 stores a computer program 132 and a difference table 134. The processor 110 performs various functions by executing the computer program 132. The processor 110 is configured to temporarily store various pieces of intermediate data, which are used when the computer program 132 is executed, in a storage device (e.g., the volatile storage device 120 or the non-volatile storage device 130). According to the present embodiment, the computer program 132 and the difference table 134 are included in a device driver which is provided by a manufacturer of the MFP 200.

The displaying device 140 is a device to display images. An example of the displaying device 140 is a liquid crystal display. The operating device 150 is a device through which operations by the user are received. Examples of the operating device 150 is a keyboard or a mouse. The user can input various instructions into the image processing apparatus 100 by operating the operating device 150.

The communication interface 170 is an interface used to communicate with other devices. Examples of the communication interface 170 are a USB interface, a wired-LAN interface, a wireless interface compliant to IEEE 802.11 and the like. According to the example shown in FIG. 1, the MFP 200 is connected to the communication interface 170.

The MFP 200 includes a processor 210, a volatile storage device 220, a non-volatile storage device 230, a displaying device 240, an operating device 250, a communication interface 270, a scanning device 280 and an print execution device 290. The above components of the MFP 200 are interconnected through a bass.

The processor 210 is a device configured to perform data processing. An example of the processor 210 is a CPU. An example of the volatile storage device 220 is a DRAM. An example of the non-volatile storage device 230 is a flash memory.

The non-volatile storage device 230 stores a computer program 232. The processor 210 performs various functions by executing the computer program 232. For example, the processor 210 executes the computer program 232 to serve as a printer driver which controls the MFP 200 in accordance with user's instructions and causes the MFP 200 to print an image. The processor 210 is configured to temporarily stores various pieces of intermediate data, which are used for execution of the computer program 232, in a storage device (e.g., the volatile storage device 220 or the non-volatile storage device 230). According to the present embodiment, the computer program 232 is stored, in advance, by the manufacturer of the MFP 200 in the non-volatile storage device 230 as a firmware.

The displaying device 240 is a device configured to display images. An example of the displaying device 240 is an LCD. The operating device 250 is a device through which user's instructions are received. An example of the operating device 250 is a touch panel overlaid on the displaying device 240. The user is capable of inputting various instructions into the MFP 200 by operating the operating device 250.

The communication interface 270 is an interface to communicate with other devices. According to the present embodiment, the communication interface 270 is connected with the communication interface 170 of the image processing apparatus 100.

The scanning device 280 is configured to optically reads an object such as an original sheet with use of a CCD or CMOS, and generates scan data representing the read image (hereinafter, referred to as scanned image). The scan data is, for example, RGB bitmap data representing a color scanned image.

The print execution device 290 is a device configured to print an image on a sheet, which is an example of a printing medium. According to the present embodiment, the print execution device 290 has a print head 292, a main scanning section 294 and a conveying section 296. It is noted that the print execution device 290 is an inkjet printing device using C (cyan) ink, M (magenta) ink and Y (yellow) ink. It is further noted that a combination of colors of inks the print execution device 290 uses does not need to be limited to the above (i.e., CMY) but other combinations such as CMY and K (black) inks may be used.

The MFP 200 is configured to cause the print execution device 290 to print images using print data provided by another device (e.g., the image processing apparatus 100). Further, the MFP 200 is configured to drive the scanning device 280 in accordance with an instruction input by the user to optically read an object and generate scan data representing the read object. Further, the MFP 200 is configured to cause the print execution device 290 to print the image represented by the thus generated scan data.

Figure 2A:
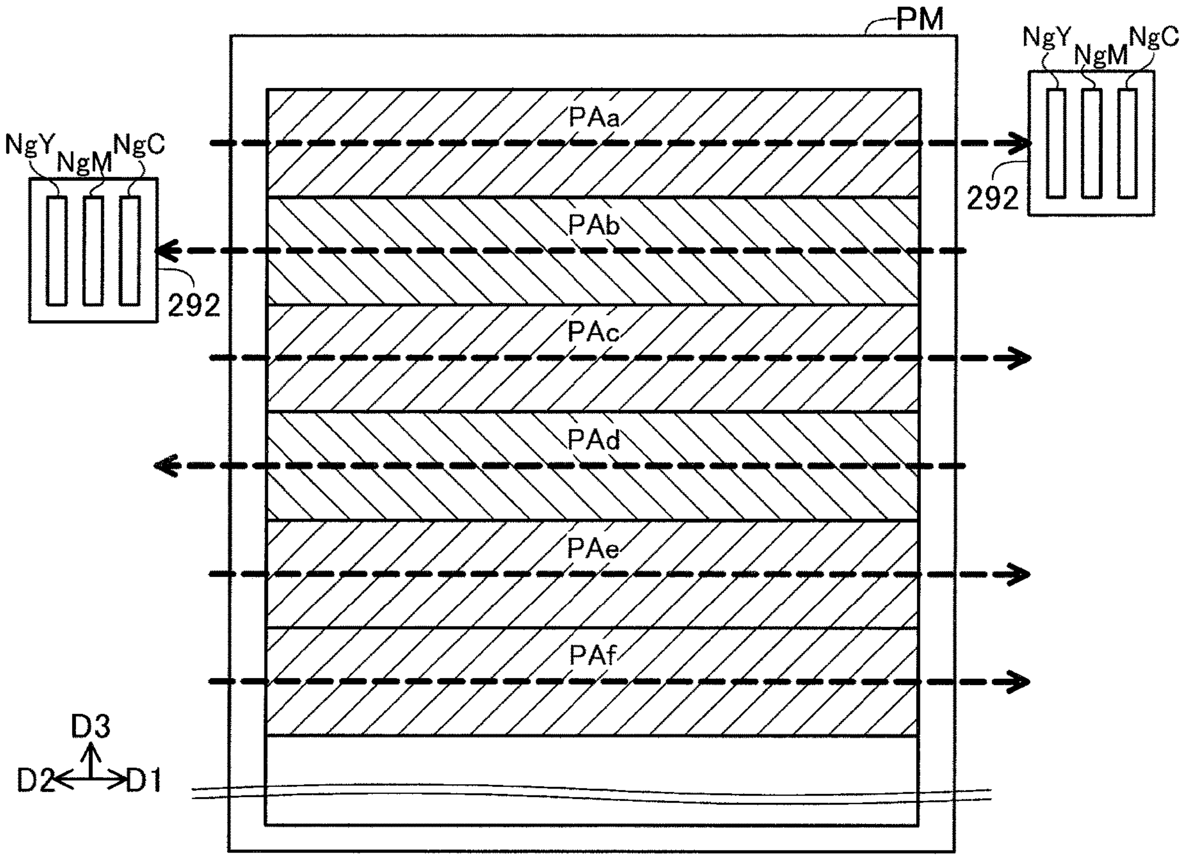
FIGS. 2A, 2B and 2C illustrate printing performed by a print execution device.

FIG. 2A schematically shows the printing sheet PM along a direction perpendicular to a surface of the printing sheet PM on which an image is to be printed. It is noted that the two print heads 292 shown in FIG. 2A are for indicating positions of the print head 292 after moving in the forward direction D1 and in the reverse direction D2, respectively, and there is actually only one print head 292 provided to the print execution device 290 according to the embodiment. Further, FIG. 2A illustrates partial areas PAa-PAf on a printing sheet PM and a moving direction of the print head 292. The main scanning section 294 (see FIG. 1) is a device configured to move the print head 292 in the main scanning direction. Specifically, a forward direction D1 and a reverse direction D2 in FIG. 2A are directions along the main scanning direction. The reverse direction D2 is an opposite direction to the forward direction D1. As in a well-known art (not shown), the main scanning section 294 has rails which slidably support the print head 292 so that the print head 292 can slidably move in the main scanning direction, multiple pulleys, a belt wound around the multiple pulleys and a motor configured to rotate the multiple pulleys. A part of the belt is secured to the print head 292. According to the above configuration, as the motor rotates the multiply pulleys, the print head 292 moves in the main scanning direction as the belt is driven to move by the multiple pulleys.

In FIG. 2A, a sub scanning direction D3 is indicated. The conveying section 296 (see FIG. 1) is a device configured to covey the printing sheet PM in the sub scanning direction D3 relative to the print head 292. As in a well-known art (not shown), the conveying section 296 includes a table supporting the printing sheet PM at a position where the printing sheet faces the print head 292, an upstream side roller arranged on an upstream side, in a sheet conveying direction, with respect to the print head 292, and a downstream side roller arranged on a downstream side, in the sheet conveying direction, with respect to the print head 292, and a motor configured to rotate the upstream side roller and the downstream side roller. The printing sheet PM is conveyed in the sub scanning direction D3 by the rotating rollers (i.e., the upstream side roller and the downstream side roller). The sub scanning direction D3 is a direction intersecting with the main scanning direction (i.e., the forward direction D1 or the reverse direction D2). According to the present embodiment, the sub scanning direction D3 is perpendicular to the main scanning direction (i.e., the forward direction D1 and the reverse direction D2).

Figure 2B:
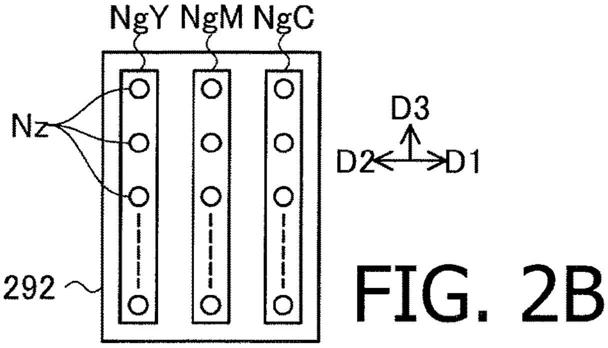

FIG. 2B illustrates an arrangement of nozzles on a bottom surface of the print head 292. As shown in FIG. 2B, on the bottom surface of the print head 292, a nozzle group NgC for ejecting C (Cyan) ink droplets, a nozzle group NgM for ejecting M (Magenta) ink droplets and a nozzle group NgY for ejecting Y (Yellow) ink droplets are formed. Positions of the multiple nozzles in each nozzle group, in the sub scanning direction D3, are different from each other. According to the present embodiment, the multiple nozzles Nz in each nozzle group are aligned along the sub scanning direction D3. Further, in the same nozzle group, the positions of the multiple nozzles Nz in the main scanning direction are the same. It is noted, however, positions, in the main scanning direction, of some of the multiple nozzles Nz in the same nozzle group may be different from the positions, in the main scanning direction, of the others. Further, positions, in the main scanning direction, of the three nozzle groups NgC, NgM and NgY are different. The print head 292 forms dots, of the ink droplets, on the printing sheet PM by ejecting ink droplets from the multiple nozzles Nz of the nozzle groups NgC, NgM and NgY to the printing sheet PM.

As shown in FIG. 2A, the print execution device 290 performs one partial printing by executing the main scanning with the main scanning section 294 while forming dots on the printing sheet PM with the printing head 292. In one partial printing, an image (i.e. a partial image) is formed on each of the rectangular partial areas PAa-PAf, each extending in the main scanning direction, of the printing sheet PM. It is noted that the image printed in one of the partial areas PAa-PAf is a partial image of an entire image to be finally printed. In the following description, such an image formed in one of the partial areas PAa-PAf will be referred to as a partial image.

The print execution device 290 coveys the printing sheet PM in the sub scanning direction D3 in response to completion of one partial printing. In this case, the conveying amount of the printing sheet PM is the same as a width, in the sub scanning direction D3, of one partial area (e.g., PAa) or the width of one partial image in the sub scanning direction D3. The print execution device 290 alternately and repeatedly performs the partial printing and the conveyance of the printing sheet by the width of the partial printing to print the entire image on the printing sheet PM. It is noted that the partial image printed by the partial printing when the print head 292 moves in the forward direction D1 will be referred to as a forward direction partial image and the partial image printed by the partial printing when the print head 292 moves in the reverse direction D2 will be referred to as a reverse direction partial image.

The partial areas PAa, PAc, PAe and PAf in FIG. 2A are the partial areas in which partial images are printed by the partial printing in the forward direction D1. These areas (i.e., the partial areas PAa, PAc, PAe and PAf) will also be referred to as forward direction partial areas. The partial areas PAb and PAd are partial areas in which partial images are printed by the partial printing in the reverse direction D2. These areas (i.e., the partial areas PAb and PAd) will also be referred to as reverse direction partial areas. In the example shown in FIG. 2A, the forward direction partial areas and the reverse direction partial areas are basically arranged alternately in the sub scanning direction D3 (c.f., partial areas PAa-PAe). The print head 292 is configured to reciprocally moves in the main scanning direction and print partial images when moving both in the forward direction D1 and the reverse direction D2. Accordingly, with use of the print head 292, printing can be performed at a high speed. It is noted however, in a normal mode (described later), multiple times of partial printing in the forward direction D1 may be performed subsequently as printings in the partial areas PAe and PAf shown in FIG. 2A.

Figure 2C:
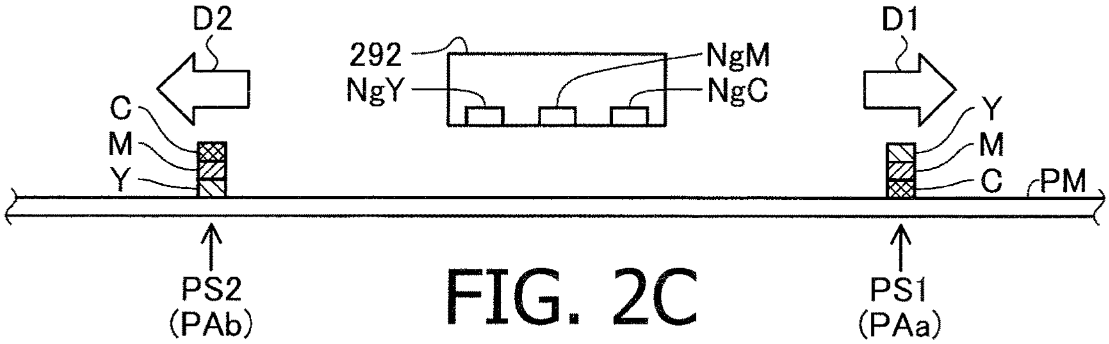

FIG. 2C illustrates superimposition orders of the color inks on the printing sheet PM. FIG. 2C schematically shows the printing head 292 and the printing sheet PM viewed along the sub scanning direction D3 (c.f., FIGS. 2A and 2B). On a right-hand portion of FIG. 2C, the superimposition order of the inks at a position PS1 in the forward direction partial area (e.g., PAa) is illustrated. According to the present embodiment, the superimposition order of the inks in the forward direction partial area is C, M and Y from the ink closer to the surface of the printing sheet PM. When the print head 292, which is moving in the forward direction D1, superimposes the three kinds of inks at the same position PS1 of the printing sheet PM, the three nozzle groups NgC, NgM and NgY eject the inks in this order (i.e., NgC, NgM and NgY).

On a left-hand portion of FIG. 2C, the superimposition order of the inks at a position PS2 in the reverse direction partial area (e.g., PAb) is illustrated. According to the present embodiment, the superimposition order of the inks in the reverse direction partial area is Y, M and C from the ink closer to the surface of the printing sheet PM. When the print head 292, which is moving in the reverse direction D2, superimposes the three kinds of inks at the same position PS2 of the printing sheet PM, the three nozzle groups NgC, NgM and NgY eject the inks in the order of NgY, NgM and NgC. Thus, the superimposition order of the inks when the print head 292 moves in the reverse direction D2 is a reverse order of the superimposition order of the inks in when the moving direction of the print head 292 is in the forward direction D1.

When the superimposed order of the inks (e.g., C, M and Y inks) are different between two images, even if the types and the amounts of the superimposed inks for the two images are the same, the two images may exhibit different colors. For example, there could be a case where the color of an image at the position PS1 in FIG. 2C and the color of an image at the position PS2 in FIG. 2C should be the same color but appears differently due to difference of the superimposition orders of the inks. Even if the same dot data is used, printing of an image with moving the print head 292 in the forward direction D1 and printing of an image with moving the print head 292 in the reverse direction D2 may result in different hues of the images. The difference of the colors between the images printed in accordance with the forward direction D1 and the image printed in accordance with the reverse direction D2 will also be referred to as a directional color difference.

The directional color difference may vary depending on amounts and/or materials of respective inks in addition to the superimposition order of the multiple types of inks. Therefore, the degree of the directional color difference may also be different depending on a characteristic of the print execution device 290 and/or the color of the image. In this regard, according to the present embodiment, the difference table 134 is used in the print data generating process (described later) in order to suppress the directional color difference.

A-2. Difference Table

The difference table 134 is a lookup table storing color values in the RGB color space CC (also known as RGB values) and index values PV indicating the degree of the directional color difference mentioned above in an associated manner.

FIG. 3A shows a flowchart illustrating a table generating process to generate the difference table 134. The difference table 134 is generated, for example, by a manufacturer of the MFP 200 before the MFP 200 is shipped. In S100, a creator of the difference table 134 causes the print execution device 290 to print multiple color patches (not shown) by the one-directional printing in the forward direction D1. It is noted that, in printing the multiple color patches in the one-directional printing in the forward direction D1, only the partial printing in the forward direction D1 is performed repeatedly. According to the present embodiment, the multiple color patches are associated with multiple representative values RV of the RGB values (also referred to as grid values), respectively.

FIG. 3B schematically shows the RGB color space CC. In FIG. 3B, at eight vertexes of the cubic RGB color space CC, references respectively indicating colors are assigned. Specifically, the cubic RGB color space CC shows a black vertex Vk (0, 0, 0), a red vertex Vr (255, 0, 0), a green vertex Vg (0, 255, 0), a blue vertex Vb (0, 0, 255), a cyan vertex Vc (0, 255, 255), a magenta vertex Vm (255, 0, 255), a yellow vertex Vy (255, 255, 0) and a white vertex Vw (255, 255, 255). It is noted that numbers indicated in parentheses above respectively indicate values of the R, G and B color components at each of the vertexes. Each of values of red components of the representative values RV is one of (Q+1) values which is obtained by equally dividing a range of the R component (i.e., from zero to 255, in this example) by Q, where Q is a particular integer such as 9, 17 or the like. So are each of values of green components of the representative values RV and each of values of blue components of the representative values.

When the multiple color patches are printed, the representative values RV of the RGB values respectively corresponding to the multiple color patches are converted into color values in the CMY color space (also referred to as CMY values) corresponding to color components of color materials for printing. Then, a halftone process is applied to patch image data having the CMY values, and print data representing multiple color patches is generated in accordance with a result of the halftone process. The print execution device 290 prints the multiple color patches in accordance with the print data. It is noted that the color converting process, the halftone process and print data generating process are the same as those in the print data generating process using the MFP 200 and are performed by, for example, the processor 210 of the MFP 200. The above configuration may be modified such that the color converting process, the halftone process and print data generating process are performed not by the MFP 200, but by another data processing apparatus connected with the MFP 200.

In S105, the creator causes the print execution device 290 to print multiple color patches by the one-directional printing in the reverse direction D2. When the multiple color patches are printed in the one-directional printing in the reverse direction D2, only the partial printing in the reverse direction D2 is performed repeatedly. The print data used in S105 to print the multiple color patches are the same as the print data used in S100.

In S110 (FIG. 3A), the creator performs colorimetric measurements of the multiple color patches printed in the forward direction D1 and the multiple color patches printed in the reverse direction D2 with use of a spectral colorimeter. As a result, for each color patch, two measurement values, that is, a colorimetric measurement value when the color patch is printed in the forward direction D1 and another colorimetric measurement value when the color patch is printed in the reverse direction D2 are obtained. The colorimetric measurement values are color values in the color space and do not depend on devices such as the print execution device 290. According to the present embodiment, the colorimetric measurement values are color values in CIELAB color space (such color values being also referred to hereinafter as Lab values).

In S120, the creator calculates color differences dM among the multiple representative values RV. A color difference dM is defined as a color difference between two colorimetric measurement values of two color patches associated with one representative value RV. An example of a formula to calculate the color difference dM is, for example, CIE 1987 L*a*b* color difference formula. Such a color difference dM is indicated by a distance (i.e., Euclidean distance) between two colors in the CIELAB color space.

In S130, the creator stores the index values PV based on the color differences dM respectively for the multiple representative values RV in association with the corresponding representative values RV in a lookup table. Thus, the difference table 134 is generated. For example, the index values PV are normalized values of the color differences dM corresponding to respective representative values RV such that the maximum value of the calculated multiple color differences dM is one.

A-3. Print Data Generating Process

FIG. 4 is a flowchart illustrating a print data generating process. According to the present embodiment. The processor 110 of the image processing apparatus 100 performs the print data generating process shown in FIG. 4 in accordance with the computer program 132. The processor 110 starts the print data generating process in response to the processor 110 receiving a print command which is input by the user through the operating device 150.

According to the present embodiment, one of a normal mode and an ink saving mode is selected as a print mode. A mode selection instruction to select one of the normal mode and the ink saving mode is input, by the user, through a selection screen (not shown). The processor 110 is configured to receive the mode selection instruction together with the print instruction.

In S200, the processor 110 obtains image data subjected to be printed (hereinafter, also referred to as target image data). For example, the processor 110 obtains image data designated by the user or a print start instruction issued by an application program as the target image data. According to the present embodiment, it is assumed that the target image data is bitmap data and a pixel value of each pixel of the target image data is indicated by 256-step gradation value of each of the R, G and B components.

When data format of the designated image data is a format different from the bitmap format (e.g., EMF (Enhanced Meta File) format), the processor 110 converts the data format (e.g., by rasterizing) to generate bitmap data, and uses the generated bitmap data as the target image data. When a pixel density of the image data is different from a particular density for the printing, the processor 110 performs a process of converting the pixel density of the image data to the image density for the print data generating process.

In S202, the processor 110 obtains partial image data representing one of unprocessed partial images within a target image represented by the target image data as attentional partial image data. According to the present embodiment, the target image is divided into multiple partial images arranged in the sub scanning direction D3. Since a conveying direction of the printing sheet PM is the sub scanning direction D3, the multiple partial images are printed one by one in a direction opposite to the sub scanning direction D3. In S202, the processor 110 selects, among the one or more unprocessed partial images, one located at an end in the sub scanning direction D3 (i.e., the partial image to be printed firstly among the one or more unprocessed partial images) and obtains the partial image data represented the thus selected partial image as the attentional partial image. Hereinafter, the partial image represented by the attentional partial image data will also be referred to as an attentional partial image.

In S205, the processor 110 determines whether the print mode is an ink saving mode or the normal mode based on the selection instruction of the print mode described above. In the ink saving mode, the amount of the ink used for printing is reduced in comparison with a case where the print mode is the normal mode. As a result, the color of the image printed in accordance with the ink saving mode is relatively thin in comparison with the image printed in the normal mode. When the print mode is the normal mode (S205: NO), the processor 110 proceeds to S211. When the print mode is the ink saving mode (S205: YES), the processor 110 proceeds to S215.

In S210, the processor 110 performs a printing direction determining process using the attentional partial image data. Then, a direction of the partial printing to print the attentional partial image (hereinafter, also referred to as an attentional partial printing) is determined to be either the forward direction D1 or the reverse direction D2. It is noted that the processor 110 evaluates a degree of directional color difference of the attentional partial image (details being mentioned later). The processor 110 calculates an evaluation value representing the result of the evaluation with reference to pixel values represented by the attentional partial image data and the difference table 134. When the evaluation value representing the directional color difference is greater than a criteria, the processor 110 determines the direction of the attentional partial printing to be a particular direction (i.e., the forward direction D1 according to the present embodiment) regardless of the printing direction of the previous partial printing. Further, when the evaluation value representing the directional color difference is equal to or smaller than the criteria, the processor 110 determines the direction of the attentional partial printing to be a direction different from (i.e., opposite to) the printing direction of the previous partial printing.

In the following description, when the evaluation value representing a color difference is compared with a criteria, it is simply described such that the color difference is compared with the criteria (e.g., the color difference is larger, equal to, or less than the criteria).

In S215, the processor 110 determines the direction of the attentional partial printing to be a direction different from (i.e., opposite to) the direction of the previous partial printing. It is noted that, in the ink saving mode, differently from the normal mode, the direction of the attentional partial printing is determined regardless of the evaluation value.

In S220, the processor 110 applies an ink usage amount reducing process to the attentional partial image data. FIG. 5 shows an example of a tone curve for the ink usage amount reducing process. The tone curve in FIG. 5 shows a relationship between an input value Vin (ranging from 0-255) and an output value Vout (ranging from 0-255). The processor 110 applies the tone curve to each of the component values of the pixel values (RGB values) of the attentional partial image data. As a result, brightness of the attentional partial image is generally raised. In other words, printing thickness of the attentional partial image is generally lowered. As described above, in the ink saving mode, as the process described above is performed, the amount of the ink used in printing is lowered.

In S225, the processor 110 performs a color difference reducing process using the attentional partial image data to which the ink usage amount reducing process has been applied. The processor 110 evaluates a degree of the directional color difference of the attentional partial image. The processor 110 calculates an evaluation value indicating a result of the evaluation with reference to the pixel value represented by the attentional partial image data and the difference table 134 (details being mentioned later).

When the directional color difference represented by the evaluation value is greater than a reference value, the processor 110 performs a compensating process to reduce the directional color difference, and generates compensated attentional partial image data. When the directional color difference represented by the evaluation value is equal to or smaller than the reference value, the processor 110 does not perform the compensating process.

In S230, the processor 110 applies the color conversion process to the attentional partial image data. The attentional partial image data subjected to the color converting process is the attentional partial image data obtained in S200 when the print mode is the normal mode.

The attentional partial image data subjected to the color converting process is the compensated attentional partial image data when the print mode is the ink saving mode and the compensating process has been performed in the color difference reducing process in S225. On the other hand, the attentional partial image data subjected to the color converting process is the attentional partial image data to which the ink usage amount reducing process has been applied when the print mode is the ink saving mode and the compensating process has not been performed in the color difference reducing process in S225.

In the color converting process, the pixel value of each pixel of the attentional partial image data is converted from the RGB values to the CMY values. Relationship between the RGB values and the CMY values is defined by a lookup table (not shown) which is stored in the non-volatile storage device 130 in advance. The processor 110 performs the color conversion with reference to this lookup table.

In S235, the processor 110 applies the halftone process to the color-converted attentional partial image data. As the halftone process, a process in accordance with so-called an error diffusion method is performed. Alternatively, a method using a dither matrix may be employed.

In S240, the processor 110 generates partial print data for printing the attentional partial image using the result of the halftone process. The partial print data is data having a format which can be interpreted by a controller 298 of the print execution device 290 of the MFP 200. The partial print data includes information indicating a direction (i.e., the forward direction D1 or the reverse direction D2) of the attentional partial printing, information indicating the result (i.e., ink-dot pattern) of the halftone process, and information indicating a conveying amount in the conveying process of the printing sheet PM after the attentional partial print is performed.

In S245, the processor 110 transmits the generated partial print data to the MFP 200. The processor 210 of the MFP 200 performs the attentional partial printing and the conveying process by controlling the print execution device 290 (i.e., the print head 292, the main scanning section 294 and the conveying section 296) based on the partial print data. As above, the attentional partial image is printed.

In S250, the processor 110 determines whether all the pieces of partial image data have been processed. When there remains unprocessed partial image data (S250: NO), the processor 110 returns to S202 to process the unprocessed partial image data. When it is determined that all the pieces of partial image data have been processed (S250: YES), the processor 110 terminates the print data generating process.

As described above, the processor 110 of the image processing apparatus 100 generates multiple pieces of partial print data respectively for multiple partial printing (S240) using the target image data, and supplies the generated multiple pieces of partial print data to the MFP 200 (S245). Then, the MFP 200 (the print execution device 290) repeated performs the partial printing to print the partial image and the sub scanning to move (convey) the printing sheet PM relative to the print head 292 in the sub scanning direction D3, thereby a printing image based on the target image data being printed on the printing sheet PM.

A-4. Printing Direction Determining Process

The printing direction determining process (FIG. 4: S210) will be described referring to FIG. 6. In S300, the processor 110 divides the attentional partial image into multiple blocks BL. FIG. 7 schematically shows the partial image and the multiple blocks BL. In FIG. 7, the partial image BI(k) is a partial image to be processed at k-th time (k being an integer). The partial image BI(k) is divided into multiple blocks BL. The shape of each block BL is rectangular. The multiple blocks BL are arranged along the main scanning direction (e.g., the forward direction D1) and the sub scanning direction D3 to form a grid pattern without clearances therebetween. A height BH of the block BL in the sub scanning direction D3 and a width BW in the main scanning direction have been determined in advance. According to the present embodiment, an arrangement of the multiple blocks BL on the attentional partial image has been determined in advance.

In S305, the processor 110 selects one of the multiple unprocessed blocks as an attentional block.

In S310, the processor 110 calculates an evaluation value EV of the attentional block using the difference table 134. The evaluation value EV is a value indicating a degree of a color difference between an image which would be printed when the attentional partial printing is performed in the forward direction D1 and an image which would be printed when the attentional partial printing is performed in the reverse direction D2 (i.e., the directional color difference). Specifically, the processor 110 identifies the index values PV of the respective pixels included in the attentional block, using the values of the respective pixels (i.e., the RGB values) of the multiple pixels and the difference table 134. Among the multiple representative values RV in the difference table 134, a particular representative value RV having a value closest to the value of a particular pixel is identified, and the index value PV associated with the particular representative value RV is determined to be the index value PV of the particular pixel. Then, the processor 110 calculates an average value of the index values of respective pixels of the attentional block, the average value being the evaluation value EV of the attentional block.

In S315, the processor 110 determines whether or not the evaluation value EV is larger than a particular threshold value Th. When it is determined that the evaluation value EV is larger than the threshold value Th (S315: YES), the processor 110 determines, in S330, that the direction of the attentional partial printing is a particular direction (in this example, the forward direction D1). When the direction of the attentional partial printing is determined (S325 or S330), the printing direction determining process is terminated.

When the evaluation value EV is equal to or less than the threshold value Th (S315: NO), the process 110 determines, in S320, whether processing of all the blocks of the attentional partial image has been completed. When it is determined that there remains unprocessed block (S320: NO), the processor 110 proceeds to S305 and performs processing of the unprocessed block. When it is determined that processing of all the blocks has been completed (S320: YES), the process 110 determines, in S325, the direction of the attentional partial printing to be a direction different from the direction of the partial printing performed immediately before the current partial printing. That is, when the direction of the partial printing performed immediately before the current partial printing is the forward direction D1, the direction of the attentional partial printing is determined to be the reverse direction D2, while, when the direction of the partial printing performed immediately before the current partial printing is the reverse direction D2, the direction of the attentional partial printing is determined to be the forward direction D1. When the direction of the attentional partial printing is determined, the printing direction determining process is terminated.

It is noted that, when the evaluation values EV of all the blocks are equal to or less than the threshold value Th, the printing direction of the partial printing is determined to be a direction opposite to the printing direction of the previous partial printing. When at least one of the blocks of the attentional partial image exhibits the EV value larger than the threshold value Th, the printing direction is determined to be the particular direction (i.e., the forward printing direction D1) regardless of the printing direction of the previous partial printing.

As is understood from the foregoing description, since the printing direction determining process as described above is performed in the normal mode, the partial image including at least one block BL of which evaluation value EV is larger than the threshold value, that is, the partial image of which the directional color difference is considered to be conspicuous is always printed in the forward direction D1. Therefore, in the normal direction, conspicuousness of the directional color difference can be suppressed. In the normal mode, there could occur a case where the partial printings in the forward direction D1 are performed subsequently. When the partial printings in the forward direction D1 are performed subsequently, after the first partial printing is performed in the forward direction D1, the main scanning in the reverse direction D2 is performed without printing, and then, the second partial printing is performed in the forward direction D1. In the above case, in comparison with a case where the partial printings are alternately performed in the forward direction D1 and in the reverse direction D2, the printing time is elongated by a time period for the main scanning in the reverse direction D2 without printing. As above, in the normal mode, the directional color difference is suppressed from being conspicuous, while the printing speed is elongated.

A-5. Color Difference Reducing Process

The color difference reducing process in S225 (FIG. 4) will be described. FIG. 8 is a flowchart illustrating the color difference reducing process. In S400 (FIG. 8), as in S300 of FIG. 6, the processor 110 divides the attentional partial image into multiple blocks BL (see FIG. 7). In S405, as in S305 of FIG. 6, the processor 110 selects one of the unprocessed multiple blocks BL of the attentional partial image as the attentional block.

In S410, the processor 110 calculates the evaluation value EV of the attentional block using the difference table 134 as in S310 of FIG. 6. In S415, as in S315 of FIG. 6, the processor 110 determines whether the evaluation value EV is larger than the particular threshold value Th.

When it is determined that the evaluation value EV is larger than the threshold value Th (S415: YES), the processor 110 generates a contribution calculation table DT using the RGB values of the multiple pixels in the attentional block (S422). FIG. 9 shows an example of the contribution calculation table DT. The contribution calculation table DT includes a list of the representative values RV, a list of the number of pixels and a list of degrees of contribution DV associated with the representative values RV.

Referring to the RGB values of the multiple pixels of the attentional block, the processor 110 associates each pixel (i.e., each of the multiple pixels of the attentional block) with a representative value RV of which Euclidean distance with respect to the RGB value of the pixel is the smallest, from among the multiple representative values RV of the RGB color space CC. The processor 110 counts the number N of the pixels associated with each of the representative values RV, and stores the numbers N corresponding to the respective representative values RV in the contribution calculation table DT. The processor 110 further calculates the degree of contribution DV for each of the multiple representative values RV and stores the same in the contribution calculation table DT. The degree of contribution DV of the particular representative value is calculated by multiplying the number N of pixels associated with the particular representative value by an index value PV associated with the particular representative value in the difference table 134. That is, DVN x PV. In the example shown in FIG. 9, the numbers N1, N2, N3, . . . respectively associated with the representative values RV1, RV2, RV3, . . . and the degrees of contribution DV1, DV2, DV3, . . . of the representative values RV1, RV2, RV3, . . . are stored.

In S425, the processor 110 identifies, with reference to the contribution calculation table DT, the representative value RVmx corresponding to the largest degree of the contribution DV.

In S430, the processor 110 determines, from among the multiple pixels included in the attentional partial image, a pixel corresponding to a representative value RVmx which is associated with the largest contribution DV as a compensation target pixel. It is noted that the pixel corresponding to the representative value RVmx is the pixel which is defined such that the representative value RV closest to the RGB values of the pixel is the representative value RVmx associated with the largest contribution DV. Since the pixel corresponding to the largest representative value RVmx is a pixel which causes the evaluation value EV to be equal to or larger than the reference value, it could also be said that such a pixel is a cause of the directional color difference.

In S440, the processor 110 identifies six close representative values RV1-RV6 which are close to the representative value RVmx which is associated with the largest degree of contribution DV. FIG. 10 shows a partial color space PCC, which is a part of the RGB color space CC, centering around the representative value RVmx associated with the largest contribution DV. As shown in FIG. 10, the six close representative values RV1-RV6 are six representative values which, from among the multiple representative values RV, are closest to the representative value RVmx associated with the largest contribution DV. Given that one side of a grid of the representative value RV is a length Lth (see FIG. 10), the six close representative values RV1-RV6 could be indicated as representative values of which distances with respect to the representative value RVmx are equal to or less than the reference length Lth. The six close representative values RV1-RV6 are representative values adjacent to the representative value RVmx on a positive direction along an R axis, on a negative direction along the R axis, on a positive direction along a G axis, on a negative direction along the G axis, on a positive direction along a B axis and on a negative direction along the B axis.

In S440, the processor 110 identifies, from among the six close representative values RV1-RV6, one associated with the minimum index PV in the difference table 134. The representative value identified in this step (i.e., S440) will also be referred to as a representative value RVam associated with the compensation destination. Since the index PV associated with the representative value RVmx associated with the largest contribution DV is relatively large, the index PV associated with the representative value RVam associated with the compensation destination is smaller than the index PV associated with the representative value RVmx.

In S445, the processor 110 determines a compensation vector AV based on the identified representative value RVam associated with the compensation destination. The compensation vector AV is a vector having, in the RGB color space, a starting point which is the representative value RVmx associated with the largest contribution DV and an end point which is the representative value RVam associated with the compensation destination. FIG. 10 shows a compensation vector AV when the close representative value RV1 adjacent to the representative value RVmx on the positive direction along the R axis is the representative value RVam associated with the compensation destination.

Given that components of the representative value RVmx are (Rmx, Gmx, Bmx) and that components of the representative value RVam are (Ram, Gam, Bam), the components (ΔR, ΔG, ΔB) of the compensation vector AV are indicated by equations (1), (2) and (3) below.

$$\Delta R = Ram - Rmx \quad (1)$$

$$\Delta G = Gam - Gmx \quad (2)$$

$$\Delta B = Bam - Bmx \quad (3)$$

That is, the compensation vector AV is a vector indicating compensation amounts ΔR, ΔG and ΔB of the RGB components, respectively.

In S450, the processor 110 compensates the compensation target pixel, which is identified in S430, based on the compensation vector AV. Concretely, the RGB values (R, G, B) of the compensation target pixel before compensation are compensated to converted RGB values (R+ΔR, G+ΔG, B+ΔB). Accordingly, the RGB values of the compensation target pixel are compensated so as to be closer to the representative values RVam associated with the compensation target than the representative values RVmx.

When compensation of the compensation target pixel is completed, the processor 110 returns to S410 and re-calculates the evaluation value EV of the attentional block using the compensated attentional partial image data. When the re-calculated evaluation value EV is larger than the threshold value Th (S415: YES), the processor 110 re-executes the process from S422 to S450 to further compensate the RGB values. Accordingly, the compensation is repeated until the evaluation value EV becomes less than the reference value.

When the evaluation value EV is equal to or less than the threshold value Th (S415: NO), the processor 110 determines, in S320, whether all the blocks in the attentional partial image have been processed. When there remain unprocessed blocks (S420: NO), the processor 110 returns to S405 and processes the unprocessed blocks. When all the blocks have been processed (S420: YES), the processor 110 terminates the color difference reducing process.

According to the above-described embodiment, the processor 110 obtains the evaluation value EV for each of the blocks BL in each of the multiple partial images using the target image data (S410 of FIG. 8). In the ink saving mode, when the color difference indicated by the evaluation value EV of the attentional partial image is larger than the reference value (i.e., S415: YES), the processor 110 identifies, using the difference table 134, the compensation target pixel and including a pixel which is a cause of the color difference from among multiple pixels within the attentional partial image (S420-S430), and performs the compensating process to convert the color of the compensation target pixel to the color of which the directional color difference is small using the difference table 134 (S435-S450).

The processor 110 generates the partial print data using the compensated attentional partial image data (S230-S240). As a result, when the color difference between an image which is printed when the attentional part printing is performed in the forward direction D1 and an image which is printed when the attentional part printing is performed in the reverse direction D2 (i.e., the directional color difference) is larger than a criteria, the pixel that is the cause of the color difference is compensated. Accordingly, in the bi-directional color printing, the color difference is suppressed from being conspicuous. Further, it is not configured such that the printing direction is merely changed when the color difference is larger than the criteria. Therefore, lowering of the printing speed due to continuously and repeatedly performed partial printings in the forward direction D1 can be suppressed. Accordingly, in the bi-directional printing, it is possible to suppress the color difference from being conspicuous with suppressing lowering of the printing speed. For example, in the normal mode, when the color difference is larger than the criteria, the partial printings in the forward direction D1 could be performed repeatedly (S315: YES, S330). Therefore, the printing speed could be lowered. However, in the ink saving mode, such lowering of the printing speed can be suppressed.

Further, according to the above-described embodiment, when the print mode is the normal mode (S205: NO), the processor 110 determines the direction of the attentional partial printing to be the forward direction D1 (S330) when the color difference indicated by the evaluation value EV is larger than the reference value (S315: YES), while the processor 110 determines the direction of the attentional partial printing to be a direction opposite to that of the partial printing performed immediately before (S325).

In the normal mode, the processor 110 generates the partial print data (S230-S240), without performing the compensating process (S435-S450), regardless of the evaluation value EV. When the printing mode is the ink saving mode (S205: YES), the processor 110 determines the direction of the attentional partial printing to be a direction different from that of the partial printing performed immediately before (S215) regardless of the evaluation value EV.

In the ink saving mode, the processor 110 generates the partial print data by performing the above-described compensating process (S435-S450) when the color difference indicated by the evaluation value EV is larger than the reference value (S415: YES). As a result, in the normal mode, the printing speed is lowered since the partial printings are repeated in the forward direction D1 when the color difference is larger than the criteria. However, since the compensation is not performed in the normal mode, the color difference is suppressed from being conspicuous and change of hue can be suppressed. In the ink saving mode, when the color difference is larger than the criteria, hue could be changed since the compensating process is performed. However, since the partial printings in the same printing direction are not subsequently performed with suppressing the color difference from being conspicuous, lowering of the printing speed can be suppressed.

Further, according to the above-described embodiment, in the ink saving mode, the process 110 applies the ink usage amount reducing process (S220) to the target image data to generate the target image data, to which the ink usage amount reducing process has been applied, and with use of the target image data having been processed, the processor 110 generates a plurality of pieces of partial print data (S225, S230-S240). In the ink saving mode, the processor 110 obtains the evaluation value EV using the target image data to which the reduction process has been applied. In the ink saving mode, the processor 110 obtains the evaluation value EV using the target image data to which the reducing process has been applied (S410). As above, since the ink usage amount reducing process is performed in the ink saving mode, the amount of the ink used in the ink saving mode is reduced in comparison with the ink amount used in the normal mode. Since the hue of the image could be changed by the ink usage amount reducing process in the ink saving mode, it is considered that a change of hue by the compensating process (S435-S450) may easily be accepted. According to the present embodiment, although the hue could be changed, the color difference could be suppressed from being conspicuous and the printing speed could be suppressed from being lowered, thereby appropriate printing corresponding to the print mode being performed.

Further, in the above-described embodiment, the processor 110 obtains the multiple index values PV respectively corresponding to multiple pixels in the attentional partial image (more specifically, the multiple pixels in the attentional block) using the difference table 134 and obtains the evaluation values EV using the multiple index values PV (S410). As a result, appropriate EV values can be obtained easily using the difference table 134.

Further, in the above-described embodiment, the processor 110 identifies multiple close representative values RV1-RV6 of which distances from the representative value RVmx closest to the RGB value of the compensation target pixel in the RGB color space are equal to or less than the reference Lth from among the multiple representative values RV in the RGB color space CC (S435).

The processor 110 identifies, from among the close representative values RV1-RV6, the representative value RVam of the compensation destination associated with the index value PV which is smaller than the index value PV associated with the representative value RVmx, namely, the representative value RVam representing less color difference (S440). The processor 110 performs the compensating process (S445, S450) so that the RGB values of the pixels subjected to compensation are closer to the representative value RVam of the compensation destination than the representative value RVam. As a result, the color difference can be made small appropriately with suppressing the hue of the pixels subjected to compensation from changing excessively.

The processor 110 calculates, again, the evaluation value (S410) using the attentional partial image data which has been compensated in the compensation process (S435-S450). When the color difference represented by the evaluation value EV is larger than the reference value (S415: YES), the processor 110 applies, again, the compensation process (S435-S450) to attentional partial image data which has been compensated. When the color difference represented by the evaluation value EV is equal to or less than the reference value (S415: NO), the processor 110 generates the partial print data using the attentional partial image data having been compensated. As a result, it is ensured that the color difference is reduced as the compensation process has been repeated.

Further, according to the above-described embodiment, the processor 110 obtains the evaluation value EV for each of the multiple blocks BL set within the attentional partial image (S400-S410). It is noted that, when one or more blocks of which color difference represented by the evaluation value is larger than the threshold value Th among the multiple blocks BL, the processor 110 determines that the color difference of the attentional partial image is larger than the criteria and executes the compensation process (S415-S450). As a result, it becomes possible to appropriately determine whether the color difference of the attentional partial image is larger than the criteria. For example, when there is a portion, in the attentional partial image, in which the color difference is locally large, it is appropriately determined that the color difference of the attentional partial image is larger than the criteria.

As is known from the foregoing description, the difference table 134 according to the present embodiment is an example of difference information. The normal mode in the present embodiment is an example of a first mode, and the ink saving mode in the present embodiment is an example of a second mode. The representative value RVmx corresponding to the largest contribution DV is an example of the first representative value, the close representative values RV1-RV6 are examples of a second representative value, and the representative value RVam corresponding to the compensation destination is an example of a particular second representative value.

B. Modifications (1) In the above-described embodiment, an execution condition for applying the compensating process to the attentional partial image data in the ink saving mode is that "at least one of the evaluation values EV of respective blocks BL within the attentional partial image is larger than the particular threshold value Th." It is noted that any of various other "execution conditions" may be employed instead of the above-described condition. For example, the execution condition may include a condition that "a ratio of the number of blocks BL each of which the evaluation value EV is equal to or larger than a particular value to the number of the multiple blocks BL within the attentional partial image is equal to or larger than a particular threshold ratio."

In the above-described embodiment, the evaluation value EV is calculated for each block BL. A configuration according to the present disclosures does not need to be limited to the above-described configuration. For example, one evaluation value may be calculated for each partial image. In such a case, for example, the index value PV corresponding to the RGB value of the image is identified for each of the multiple pixels within the attentional partial image, and a sum or an average of the index values PV of the multiple pixels may be used as the evaluation value EV. For another example, the processor 110 may refer to the difference table 134 and obtains one index value corresponding to an average color of the attentional partial image as the evaluation value EV.

Further, the compensation process may be performed regardless of whether the print mode is the ink saving mode or the normal mode.

Generally, it is preferable that the compensation process is performed in a particular case where the color difference (i.e., the directional color difference) indicated by the evaluation value calculated for each of the multiple partial images is larger than the reference value.

(2) In the above-described embodiment, when the print mode is the ink saving mode, the compensation process is performed on condition that the above-describe execution condition is satisfied, while the compensation process is not performed when the print mode is the normal mode. Instead of the above, it may be configured that the compensation process may be performed, regardless of the print mode, when the above-described execution condition for the compensation process is satisfied.

The MFP 200 may be configured such that a high speed mode or a high quality mode is selectable as the print mode. The high speed mode is a mode in which a printing speed is prioritized over an image quality, while the high quality mode is a mode in which the image quality is prioritized over the printing speed. When the MFP 200 is configured as above, the MFP 200 may further be configured such that, when the print mode is the high speed mode, the compensation process may be performed on condition that the above-condition is satisfied, while the compensation process may not be performed when the print mode is the high quality mode.

(3) In the above-described embodiment, in the ink saving mode, the compensation process is repeatedly performed until the evaluation value EV is less than the threshold value Th. Instead, it may be configured such that, when the evaluation value EV is larger than the threshold value Th even though the compensation process is repeated by a particular number of times (e.g. one to several times), the processor 110 may determine the printing direction of the attentional partial printing as the forward direction D1 regardless of the printing direction of the previous partial printing, and generate the partial print data using the attentional partial image data before compensation.

(4) In the above-described embodiment, the difference table 134 is used as the difference information. Aspects of the present disclosures do not need to be limited to such a configuration. For example, the difference information may be a particular function (e.g., information indicating an arithmetic formula) configured to output the index value PV in response to the RGB value being input as an input value.

(5) In the above-identified embodiment, the evaluation value EV is calculated using the attentional partial image data, which is the RGB image data, and the compensating process is applied to the attentional partial image data which is also the RGB image data. Instead of the above configuration, after the RGB image data is converted into the CMYK image data and the compensation process may be applied to the CMYK image data. Further, the evaluation value EV may be calculated using the CMYK image data.

(6) In the compensation process according to the above-described embodiment, the representative value RVam of the compensation destination is identified from among six close representative values RV1-RV6 which are adjacent to the representative value RVmx corresponding to the largest contribution DV, and the color of the compensation target pixel is converted so that the representative value thereof becomes closer to the representative value RVam of the compensation destination.

It is noted that a mode of compensation process does not need to be limited to the above-described configuration. For example, the representative value RVam of the compensation destination may be identified from among 18 representative values including 12 representative values RVx which are next adjacent to the representative value RVmx than the six close representative values RV1-RV6. In FIG. 10, symbols "RVx" are assigned only to three of 12 representative values RVx. There is tendency that the higher the thickness is, the larger the color difference is. Therefore, a compensation to lower the thickness of the compensation target pixel may be performed.

(7) In the above-described embodiment, the compensation target pixel is determined based on the representative value RVam corresponding to the largest contribution DV. However, aspects of the present disclosure do not need to be limited to such a configuration. For example, the compensation target pixel may be determined based on two representative values corresponding to the first and second largest contributions DV, or the first, second and third largest representative values DV.

(8) Pixels used for identifying the evaluation values EV of the blocks BL may be a part of multiple pixels included in the blocks BL. For example, multiple pixels evenly selected (e.g., every other pixels) from the blocks BL may be used. Generally, it is preferable that an evaluation value of a block BL is identified using a pixel value of each of one or more pixels selected from multiple pixels included in the block BL.

It is noted that any of various values respectively determined based on pixel values of one or more pixels within the block BL may be used as the evaluation value EV of the block BL. For example, instead of an average value of index values of one or more pixels within the block BL, any one of a maximum value, a median value, a mode value and a minimum value may be used. Alternatively, an index value associated with one pixel value which is obtained by generalizing multiple pixel values of one or more pixels within the block BL may be referred to as the evaluation value EV of the block BL. As a method of generalizing multiple pixel values to identify a single pixel value, any of methods using any of an average value, a maximum value, a median value, a mode value and a minimum value of multiple pixel values may be used.

(9) As the configuration of the main scanning section 294, any of other configurations in which the print head 292 is configured to reciprocally move in the main scanning direction may be used instead of the configuration of the above-described embodiment/modifications. Further, as the configuration of the conveying section 296, any of other configurations which is configured to convey the printing sheet PM in the sub scanning direction may be used instead of the configuration of the above-describe embodiment/modifications.

It is noted that the total number of color inks (generally, color agents) the print execution device 290 can use is equal to two or more. For example, the print execution device 290 may be configured to use C (cyan), M (magenta), Y (yellow) and K (black) inks. Further, it is preferable that the print head 292 is provided with nozzle groups the number of which is the same as the number of the types of usable inks. In other words, the print head 292 is provided with L (L being an integer equal to two or more) nozzle groups, and the L nozzle groups may be configured to eject L different color agents, respectively. According to such a configuration, since the print head 292 is provided with the minimal number of nozzle groups, the configuration of the print head 292 can be simplified. According to such a configuration, two nozzle groups arbitrarily selected from among the multiple nozzle groups of the print head 29 eject different kinds of inks (e.g., different color inks).

(10) Generation of the difference table 134 described referring to FIG. 3 may be performed not by the manufacturer of the MFP 200, but in accordance with a user instruction. For example, the processor 210 of the MFP 200 may performs S100-S150 of FIG. 3 in accordance with the user's instruction. For example, the processor 210 performs printing of the patch 8 (see S100 and S105 of FIG. 3) by controlling the print execution device 290, and performs the colorimetry of the patch (S110) by controlling the scanning device 280. It is noted that generation of the difference table 134 in accordance with the user's instruction may be performed after shipment of the MFP 200.

(11) It is noted that the processor 210 of the MFP 200 may perform the print data generating process shown in FIG. 4 by executing the computer program 232 instead of the image processing apparatus 100. In such a case, the process 210 of the MFP 200 operates as the image processing apparatus.

(12) It is noted that the image processing apparatus 100 shown in FIG. 1 may be a device (e.g., a digital camera, a scanner or the like) which is different from a personal computer. Further, the device including the print execution device may be a device (e.g., a single-function printer) which is different from the MFP 200. It is noted that multiple devices (e.g., multiple computers) configured to communicate with each other through a network may share the image processing function of the image processing apparatus so as to provide the image processing function as a whole. In such a case, the multiple devices serve as the image processing apparatus as a whole.

It is noted that a part of the configuration realized by the hardware in the above-described embodiment and/or modifications may be replaced with software. Further, a part of or all of the configuration realized by the software in the above-described embodiment and/or modifications may be replaced with hardware. For example, all or a part of the processes performed in S230, S235 and S240 may be replaced with dedicated hardware circuits.

When all of or a part of the functions according to the above-described configuration can be realized by a computer program, such a computer program may be provided as a non-transitory computer-readable recording medium storing such a computer program. It is noted that the computer program can be used in a state where the computer program is stored in a computer-readable recording medium which is the same or a different recording medium. The computer-readable recording medium may be a portable recoding medium such as a memory card, a CD-ROM or the like. Alternatively or optionally, the computer-readable recording medium may include an internal storage device inside a computer such as a ROM, or an external storage device communicably connected with the computer such as a hard disk drive.

It is noted that the above-described embodiment and modifications are not for limiting aspects of the present disclosures, but for clarifying aspects of the present disclosures. It should be noted that configurations of the above-described embodiment and modifications can be further modified and/or improved without departing from aspects of the present disclosures.

What is claimed is:

1. An image processing apparatus configured to generate print data to be used by a print execution device, the print execution device having a print head, the print head being provided with first nozzles configured to eject a first ink and second nozzles configured to eject a second ink, the first nozzles and the second nozzles being arranged on different positions in a main scanning direction, the image processing apparatus having a controller configured to generate partial print data, the print execution device being configured to perform a partial printing, in accordance with the partial print data, by driving the print head to repeatedly perform:

a main scanning to move in the main scanning direction relative to a printing medium, the ink being ejected on to the printing medium while the print head is being moved in the main scanning; and a sub scanning to move the printing medium relative to the print head in a sub scanning direction which is a direction intersecting with the main scanning direction, wherein the controller is configured to cause the image processing apparatus to perform:

an image obtaining process of obtaining target image data indicating a target image to be printed referring to color values of a particular color space; and a mode selecting process of selecting a print mode to be performed from among multiple print modes, including a first print mode and a second print mode, in accordance with a user instruction, the first print mode being different from the second print mode;

wherein, when the print mode is the first print mode, the controller operates a direction determining process of determining whether or not an evaluation value of the each of partial images is larger than a second reference value to determine a printing direction of the particular partial printing as one of the first direction and the second direction, wherein the controller operates such that when the evaluation value is larger than the second reference value, the controller determines, in the direction determining process, the printing direction of the particular partial printing to be the first direction, while when the evaluation value is equal to or less than the second reference value, the controller determines, in the direction determining process, the printing direction of the particular partial printing to be a direction opposite to the printing direction of the partial printing that is performed immediately before, wherein, when the print mode is the second mode, the controller performs a first determining process, without operating the direction determining process, to determine the printing direction of the particular partial printing to be a direction opposite to the printing direction of the partial printing that is performed immediately before, a reducing process, without operating the direction determining process, to the target image data to reduce an amount of ink used in the printing image; and a generating process to generate the multiple pieces of partial print data using the target image data to which the reducing process has been applied;

an evaluation value obtaining process of obtaining, for the partial images included in the target image to which the reducing process has been applied, the evaluation value being indicative of a color difference between an image which would be printed when the partial printing to print the partial image is performed in a first direction along the main scanning direction, and an image which would be printed when the partial printing to print the partial image is performed in a second direction opposite to the first direction based on the target image data, the evaluation value being obtained using difference information associating the color value in the particular color space with degree of the color difference;

a second determining process, after the evaluation value obtaining process, to determine whether or not the evaluation value of the each of the partial images is larger than a first reference value;

an identifying process identifying, when the evaluation value of the each of the partial images is larger than the first reference value, compensation target pixels including a pixel causing the color difference from among multiple pixels within the particular partial image by using the difference information;

a compensating process of converting a color of the compensation target pixel to a color of which color difference is small by using the difference information; and a print data generating process of generating, using the target image data, multiple pieces of the partial print data respectively for multiple partial printings, the partial print data including the partial image data to which the compensating process has been applied; and wherein the print execution device is configured to print a printing image based on the target image data by performing the multiple partial printings, the multiple partial printings including the partial printings performed in the first direction and partial printings performed in the second direction.

2. The image processing apparatus according to claim 1, wherein the difference information includes a table storing index values corresponding to the multiple representative values of color values of the particular color space, respectively, each of the index values indicating degree of the color difference, and wherein, in the evaluation value obtaining process, the controller obtains multiple index values corresponding to multiple pixels in the partial image using the table and obtains the evaluation value based on the multiple index values as obtained.

3. The image processing apparatus according to claim 1, wherein the difference information is a table storing index values corresponding to multiple representative values of the color values of the particular color space, respectively, and each index value indicating degree of the color difference, and wherein, in the print data generating process, the controller is configured to:

identify, in the particular color space, a first representative value closest to a value of the compensation target pixel and multiple second representative values of which distances from the first representative value are equal to or less than a reference value, from among the multiple representative values;

identify a particular second representative value, from among the second representative value, indicating the color difference smaller than that of the first representative value; and perform the compensating process so that the value of the compensation target pixel is closer to the particular second representative value than to the first representative value.

4. The image processing apparatus according to claim 1, wherein, in the evaluation value obtaining process, the controller causes the image processing apparatus to obtain the evaluation value of the particular partial image to which the compensating process has been applied using the particular partial image data to which the compensation process has been applied, wherein, in the compensating process, the controller causes the image processing apparatus to apply the compensating process again to the particular partial image data to which the compensating process has been applied when the color difference indicated by the evaluation value of the particular partial image to which compensating process has been applied is larger than the first reference value, and wherein, in the print data generating process, the controller causes the image processing apparatus to generate the partial print data using the particular partial image data to which the compensating process has been applied when the color difference indicated by the evaluation value of the particular partial image to which compensating process has been applied is equal to or less than the reference value.

5. The image processing apparatus according to claim 1, wherein, in the evaluation obtaining process, the controller causes the image processing apparatus to obtain the evaluation values of the multiple blocks defined within the particular partial image, respectively, and wherein, in the print data generating process, the controller causes the image processing apparatus to perform the compensating process when at least one block of which color difference indicated by the evaluation value is larger than a threshold value among the multiple blocks.

* * * * *